US011866099B2

(12) United States Patent
Schwartz et al.

(10) Patent No.: US 11,866,099 B2
(45) Date of Patent: Jan. 9, 2024

(54) REFUSE BODY ADAPTER

(71) Applicant: Oshkosh Corporation, Oshkosh, WI (US)

(72) Inventors: Leslie Schwartz, Owatonna, MN (US); Robert Ryan, Oshkosh, WI (US); Matthew Deinema, Oshkosh, WI (US); John Kellander, Oshkosh, WI (US); Emily Davis, Rochester, MN (US); Rob Messina, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/088,033

(22) Filed: Dec. 23, 2022

(65) Prior Publication Data

US 2023/0130029 A1  Apr. 27, 2023

Related U.S. Application Data

(63) Continuation of application No. 17/228,340, filed on Apr. 12, 2021, now Pat. No. 11,535,308, which is a continuation of application No. 16/390,769, filed on Apr. 22, 2019, now abandoned.

(60) Provisional application No. 62/661,482, filed on Apr. 23, 2018.

(51) Int. Cl.
*B62D 24/00* (2006.01)
*B62D 27/06* (2006.01)
*B62D 21/18* (2006.01)
*B65F 3/00* (2006.01)

(52) U.S. Cl.
CPC ............. *B62D 27/06* (2013.01); *B62D 21/18* (2013.01); *B62D 24/00* (2013.01); *B65F 3/00* (2013.01); *B65F 2003/008* (2013.01)

(58) Field of Classification Search
CPC ........ B62D 33/04; B62D 24/00; B62D 27/06; B62D 27/065; B62D 21/18; B65F 3/14; B65F 2003/008
USPC ................................ 296/35.1, 35.3; 411/546
See application file for complete search history.

(56) References Cited

U.S. PATENT DOCUMENTS

| 2,756,693 | A |   | 7/1956 | Frost |
| 2,815,243 | A |   | 12/1957 | Campbell |
| 2,938,118 | A |   | 5/1960 | Martin |
| 2,946,802 | A |   | 7/1960 | Zima et al. |
| 3,131,923 | A |   | 5/1964 | Clasen et al. |
| 3,151,858 | A |   | 10/1964 | Urquhart |
| 3,374,030 | A | * | 3/1968 | Brisebois .................. B60P 7/13 414/373 |
| 3,377,039 | A |   | 4/1968 | Hayes |
| RE27,034 | E |   | 1/1971 | Bezla J |
| 3,567,274 | A |   | 3/1971 | Kaptur, Jr. et al. |
| 3,602,474 | A |   | 8/1971 | Deering et al. |
| 3,799,607 | A |   | 3/1974 | Shakespear |

(Continued)

*Primary Examiner* — Dennis H Pedder
(74) *Attorney, Agent, or Firm* — Foley & Lardner LLP (57) ABSTRACT

A refuse body adapter includes a sub-frame assembly, a sub-frame adapter, and a spacer. The sub-frame assembly is configured to be coupled to a cargo body. The sub-frame adapter is configured to be coupled to a chassis of a vehicle. The spacer is coupled to both the sub-frame assembly and the sub-frame adapter. The spacer is disposed in a gap formed between the sub-frame assembly and the sub-frame adapter. A thickness of the spacer may be adjusted to accommodate different gap sizes between the sub-frame assembly and the sub-frame adapter.

19 Claims, 9 Drawing Sheets

(56) References Cited

U.S. PATENT DOCUMENTS

| | | | |
|---|---|---|---|
| 3,893,399 A | 7/1975 | Lewis et al. | |
| 4,007,958 A | 2/1977 | Peifer et al. | |
| 4,315,646 A | 2/1982 | McReynolds | |
| 4,456,414 A | 6/1984 | Williams | |
| 4,634,168 A | 1/1987 | Fuchs et al. | |
| 4,648,208 A | 3/1987 | Baldamus et al. | |
| 4,696,609 A | 9/1987 | Cole | |
| 4,699,410 A | 10/1987 | Seidel | |
| 4,778,193 A | 10/1988 | Torcomian | |
| 4,850,636 A | 7/1989 | McLaren et al. | |
| 4,887,659 A | 12/1989 | West | |
| 4,907,921 A | 3/1990 | Akright | |
| 4,914,863 A | 4/1990 | Laukhuf | |
| 5,180,263 A | 1/1993 | Flowers, Jr. | |
| 5,253,589 A | 10/1993 | Kawanishi et al. | |
| 5,255,952 A | 10/1993 | Ehrlich | |
| 5,295,527 A | 3/1994 | West | |
| 5,378,010 A | 1/1995 | Marino et al. | |
| 5,562,390 A | 10/1996 | Christenson | |
| 5,573,360 A | 11/1996 | Bennett | |
| 5,697,741 A | 12/1997 | Harris et al. | |
| 5,774,948 A | 7/1998 | Petschke et al. | |
| 5,779,300 A | 7/1998 | McNeilus et al. | |
| 5,799,585 A | 9/1998 | Brennan et al. | |
| 5,829,946 A | 11/1998 | McNeilus et al. | |
| 5,931,628 A | 8/1999 | Christenson | |
| 5,983,806 A | 11/1999 | Brennan et al. | |
| 6,068,327 A | 5/2000 | Junginger | |
| 6,098,695 A | 8/2000 | Schwingle | |
| 6,176,666 B1 * | 1/2001 | Osterlund | F16B 5/02 411/546 |
| 6,213,696 B1 | 4/2001 | Austin | |
| 6,233,875 B1 | 5/2001 | Carlo et al. | |
| 6,234,565 B1 | 5/2001 | Bryant et al. | |
| 6,279,988 B1 | 8/2001 | Muraro | |
| 6,290,450 B1 | 9/2001 | Humphries et al. | |
| 6,315,141 B1 | 11/2001 | Brennan, Jr. | |
| 6,318,782 B1 | 11/2001 | Suzuki et al. | |
| 6,427,947 B1 | 8/2002 | Rohrlick et al. | |
| 6,471,284 B2 | 10/2002 | Landmesser | |
| 6,485,079 B1 | 11/2002 | Brown et al. | |
| 6,505,882 B1 | 1/2003 | Morbach et al. | |
| 6,508,035 B1 | 1/2003 | Seksaria et al. | |
| 6,527,495 B2 | 3/2003 | Humphries et al. | |
| 6,543,829 B2 | 4/2003 | Brown | |
| 6,554,346 B2 | 4/2003 | Sugimoto | |
| 6,588,828 B2 | 7/2003 | Fisher | |
| 6,655,698 B2 | 12/2003 | Nozaki et al. | |
| 6,682,130 B2 | 1/2004 | Lustig et al. | |
| 6,695,554 B2 | 2/2004 | Afful | |
| 8,376,655 B2 * | 2/2013 | Marsolek | E01C 19/26 404/103 |
| 8,794,886 B1 | 8/2014 | Nett et al. | |
| 8,967,699 B1 | 3/2015 | Richmond et al. | |
| 9,045,014 B1 | 6/2015 | Verhoff et al. | |
| 9,174,686 B1 | 11/2015 | Messina et al. | |
| 9,366,507 B1 | 6/2016 | Richmond et al. | |
| 9,656,640 B1 | 5/2017 | Verhoff et al. | |
| 9,707,869 B1 | 7/2017 | Messina et al. | |
| 10,494,038 B2 | 12/2019 | Irie et al. | |
| 2002/0025245 A1 | 2/2002 | Humphries et al. | |
| 2003/0021660 A1 | 1/2003 | Wells | |
| 2003/0047956 A1 | 3/2003 | Schrafel | |
| 2003/0230412 A1 | 12/2003 | Archer | |
| 2004/0165977 A1 | 8/2004 | Hecker | |
| 2004/0228699 A1 | 11/2004 | Venton-Walters et al. | |
| 2006/0039771 A1 | 2/2006 | Zhou | |
| 2006/0055206 A1 | 3/2006 | Morrow et al. | |
| 2006/0087152 A1 | 4/2006 | Kuriakose | |
| 2007/0222253 A1 | 9/2007 | Wood et al. | |
| 2007/0296248 A1 | 12/2007 | Kuriakose | |
| 2008/0036232 A1 | 2/2008 | Randjelovic et al. | |
| 2008/0129068 A1 | 6/2008 | Brummel et al. | |
| 2010/0052357 A1 | 3/2010 | Howell et al. | |
| 2011/0233952 A1 | 9/2011 | Kuriakose et al. | |
| 2015/0033962 A1 | 2/2015 | Schwartz et al. | |
| 2015/0151651 A1 | 6/2015 | Stingle et al. | |
| 2015/0175353 A1 | 6/2015 | Gillmore et al. | |
| 2016/0023548 A1 | 1/2016 | Crist et al. | |
| 2016/0375805 A1 | 12/2016 | Krueger et al. | |
| 2017/0036628 A1 | 2/2017 | Nelson et al. | |
| 2017/0121108 A1 | 5/2017 | Davis et al. | |
| 2017/0158050 A1 | 6/2017 | Crist et al. | |
| 2017/0349374 A1 | 12/2017 | Haddick et al. | |
| 2018/0026289 A1 | 1/2018 | Finnerty et al. | |
| 2018/0334324 A1 | 11/2018 | Haddick et al. | |

\* cited by examiner

FIG. 7D

REFUSE BODY ADAPTER

CROSS-REFERENCE TO RELATED PATENT APPLICATIONS

The present application is a continuation of U.S. patent application Ser. No. 17/228,340, filed Apr. 12, 2021, which was a continuation of U.S. patent application Ser. No. 16/390,769, filed Apr. 22, 2019, which claims the benefit of and priority to U.S. Provisional Patent Application No. 62/661,482, filed Apr. 23, 2018, all of which are incorporated herein by reference in their entirety.

BACKGROUND

Cargo bodies may be manufactured separately from the vehicle chassis and are configured to pair with and mount to a single chassis design. These cargo bodies are not easily adapted for use with third-party chassis designs, which may not provide adequate support for the cargo body and may result in an incorrect positioning of the cargo body with respect to other vehicle components (e.g., a front cabin of the vehicle), or inadequate ground clearance.

SUMMARY

One embodiment relates to a refuse body adapter. The refuse body adapter includes a sub-frame assembly, a sub-frame adapter, and a spacer. The sub-frame assembly is configured to be coupled to a cargo body. The sub-frame adapter is configured to be coupled to a chassis of a vehicle. The spacer is coupled to both the sub-frame assembly and the sub-frame adapter. The spacer is disposed in a gap formed between the sub-frame assembly and the sub-frame adapter. A thickness of the spacer may be adjusted to accommodate different gap sizes between the sub-frame assembly and the sub-frame adapter.

Another embodiment relates to a refuse body adapter. The refuse body adapter includes a sub-frame assembly, a spacer, and a sub-frame adapter. The sub-frame assembly includes a first frame member and a second frame member oriented substantially parallel to the first frame member. The second frame member is spaced a first distance apart from the first frame member. The sub-frame assembly additionally includes a stringer having a first end that is coupled to the first frame member and a second end that is coupled to the second frame member. The spacer is coupled to the first frame member. The sub-frame adapter includes a first connecting region and a second connecting region. The first connecting region is configured to be coupled to one of the plurality of frame rails of a chassis of a vehicle. The second connecting region is coupled to the spacer. A thickness of the spacer may be adjusted to accommodate a gap formed between the first frame member and one of the plurality of frame rails.

Another embodiment relates to a vehicle. The vehicle includes a chassis, a sub-frame assembly, a spacer, and a sub-frame adapter. The sub-frame assembly includes a first frame member and a second frame member oriented substantially parallel to the first frame member. The second frame member is spaced apart from the first frame member. The sub-frame assembly additionally includes a stringer having a first end that is coupled to the first frame member and a second end that is coupled to the second frame member. The spacer is coupled to the first frame member. The sub-frame adapter includes a first connecting region and a second connecting region. The first connecting region is coupled to the first frame rail. The second connecting region is coupled to the spacer. A thickness of the spacer may be adjusted to accommodate a gap formed between the first frame member and the first frame rail.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an adapter facilitates mounting of a cargo body to a third-party designed chassis (e.g., a chassis not specifically designed to accommodate the cargo body). In particular, the adapter facilitates providing adequate structural support to the cargo body, while also facilitating the alignment of the cargo body with other vehicle components.

Figure 1:
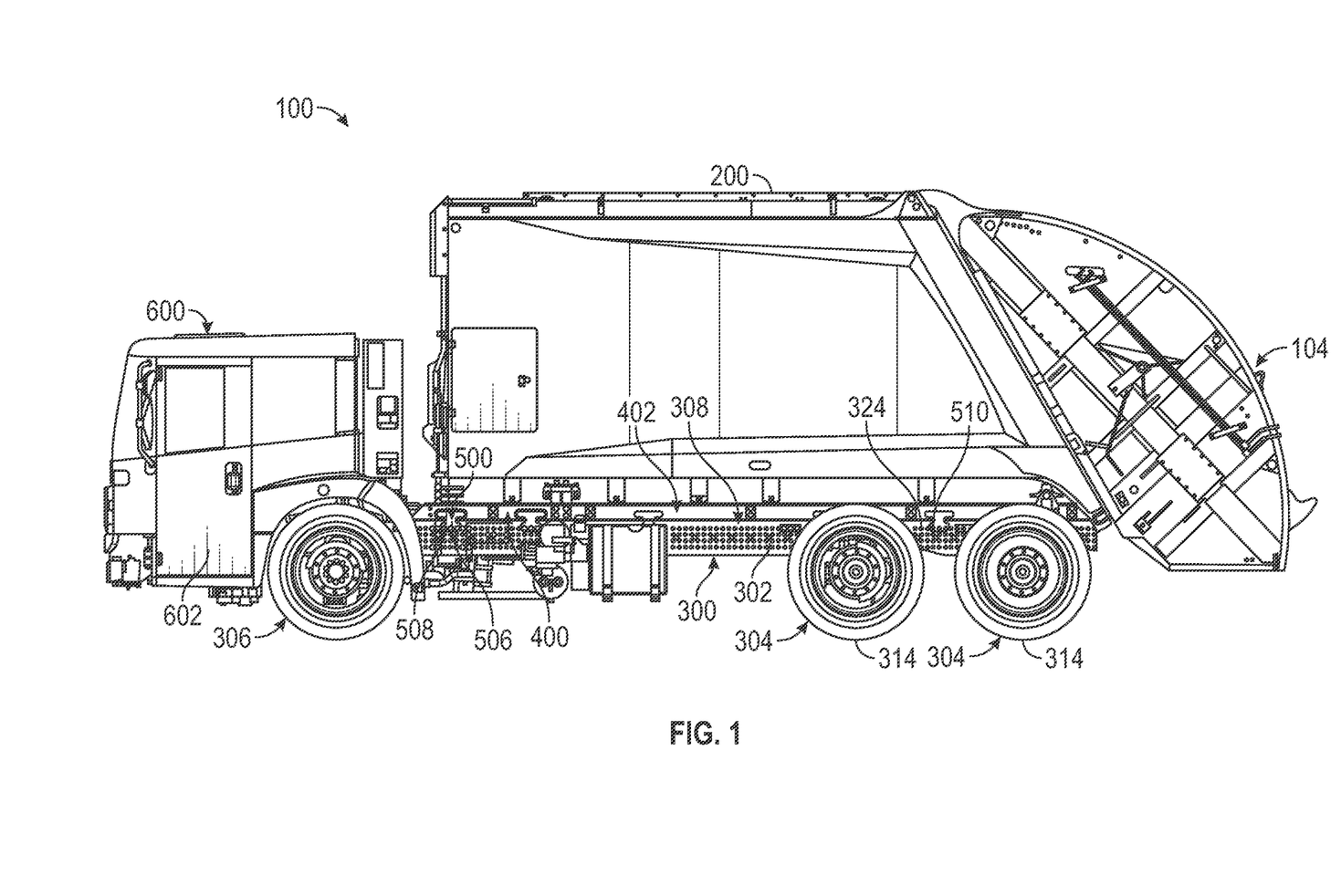
FIG. 1 is a side view of a vehicle, according to an illustrative embodiment.
Figure 2:
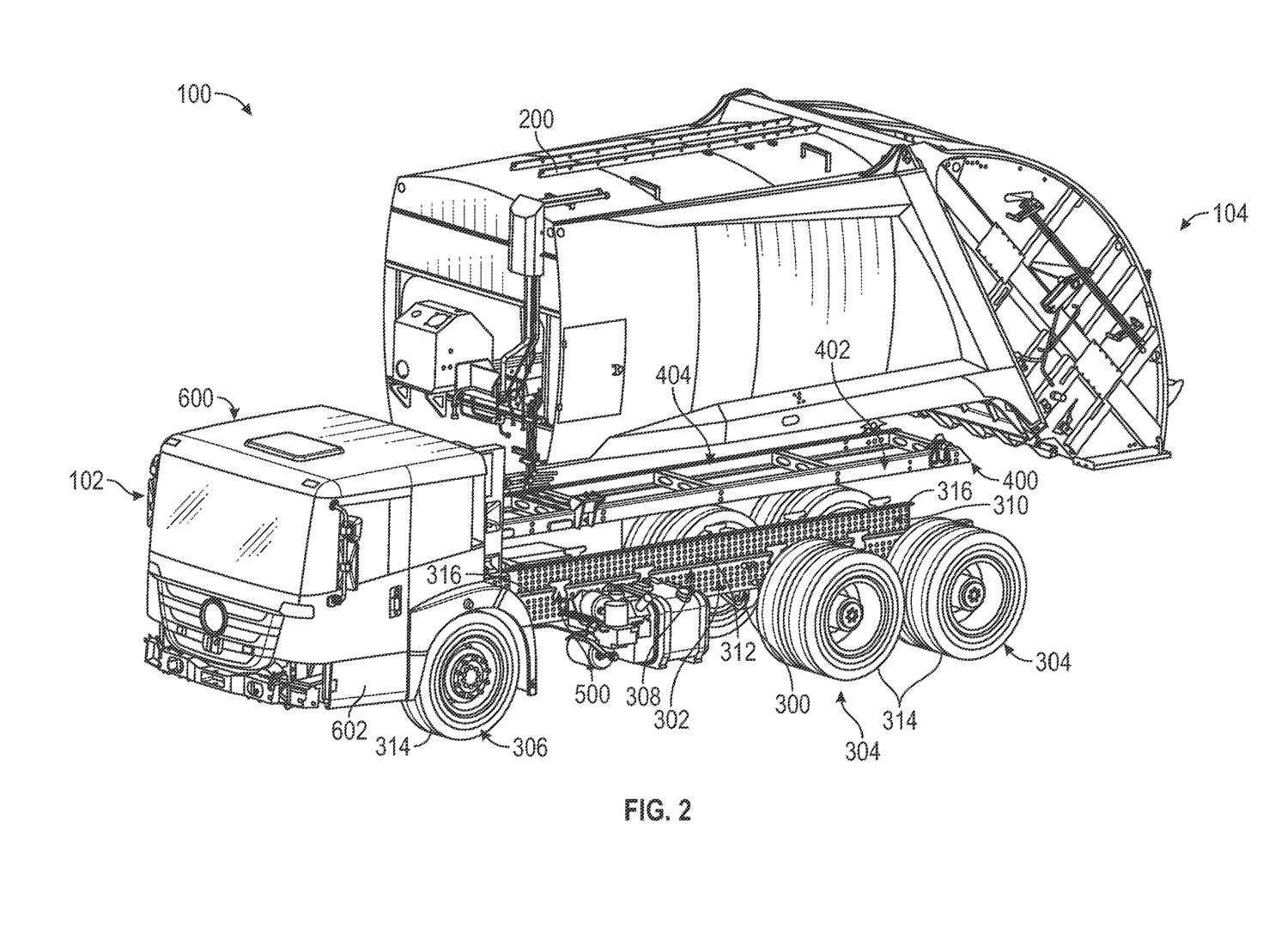
FIG. 2 is a perspective view of the vehicle of FIG. 1, shown with a cargo body and a sub-frame assembly separated from the vehicle.

According to the exemplary embodiment shown in FIGS. 1 and 2, a vehicle, shown as the vehicle 100, is a refuse vehicle that is traditionally used to transport material from various waste receptacles within a municipality to a storage or processing facility (e.g., a landfill, an incineration facility, a recycling facility, etc.). The refuse vehicle includes a refuse body (e.g., cargo body 200) that is used to collect material from multiple waste receptacles, reducing the number of trips required between the municipality and the storage or processing facility. In the embodiment of FIGS. 1 and 2, the refuse vehicle further includes a chassis 300, a sub-frame assembly 400, and a plurality of sub-frame adapters, shown as universal mounting brackets 500.

FIG. 2 shows the refuse body (e.g., cargo body 200) and the sub-frame assembly 400 separated from the remainder of the refuse vehicle 100. As shown in FIG. 2, the sub-frame assembly 400 is formed from a series of cross-bar elements that frame out a region of space in-between the refuse body and a structural frame 302 of the chassis 300. In the embodiment of FIGS. 1 and 2, the refuse body is configured to mount directly to the sub-frame assembly 400, which is further adapted to mount to a third party vehicle chassis, such as the chassis 300 shown in FIGS. 1 and 2. The sub-frame assembly 400 serves at least two important functions: 1) to stabilize the refuse body structurally with respect to the chassis 300, and 2) to space the refuse body from the chassis 300 by an amount that provides adequate ground clearance for the refuse body and also provides clearance between the refuse body and rear wheels (e.g. wheel and tire assemblies 314).

As shown in FIG. 1, the sub-frame assembly 400 is coupled to the chassis 300 by a series of universal mounting brackets 500, which are disposed along each side of the vehicle 100. In the embodiment of FIG. 1, an upper end (e.g., second connecting region 508) of each universal mounting bracket 500 is coupled to an outside edge of the sub-frame assembly 400 while at the same time a lower end (e.g., first connecting region 506) of each universal mounting bracket 500 is coupled to an outside edge of the chassis 300. In the embodiment of FIG. 1, the upper end of each universal mounting bracket 500 is permanently affixed (e.g., welded) to the sub-frame assembly 400, while the lower end of each universal mounting bracket 500 is removably fastened to the chassis 300, for example by using a series of bolts or rivets that extend through holes in the universal mounting bracket 500 and corresponding holes in the chassis 300. The details of the general depictions provided in FIGS. 1 and 2 will be more fully explained by reference to FIGS. 3-7D.

FIGS. 1 and 2 show an illustrative embodiment of a vehicle, shown as vehicle 100. The vehicle 100 includes a chassis, shown as chassis 300, that supports a first body portion, shown as front cabin 600, and a second body portion, shown as cargo body 200. As shown in FIGS. 1 and 2, the front cabin 600 is disposed on a front end 102 of the vehicle 100. The cargo body 200 is disposed behind the front cabin 600 toward a rear end 104 of the vehicle 100. The chassis 300 engages a plurality of tractive assemblies, shown as rear tractive assemblies 304 and front tractive assemblies 306. According to the illustrative embodiment of FIGS. 1 and 2, the vehicle 100 is a refuse vehicle that is traditionally used to transport material from various waste receptacles within a municipality to a storage or processing facility (e.g., a landfill, an incineration facility, a recycling facility, etc.). However, the systems and methods of this disclosure are not limited to a single vehicle type. In an alternative embodiment, the vehicle 100 is another type of on-road truck such as a commercial truck with cargo carrier or a concrete mixer. Alternatively, the vehicle 100 is an off-road vehicle that includes a cargo body, such as vehicles used to transport fill and rocks for mining or construction.

According to the illustrative embodiment shown in FIG. 2, the chassis 300 may be of any third-party design (e.g., a chassis 300 not designed specifically to accommodate the cargo body 200 shown in FIG. 2). The chassis 300 includes frame rails, shown as a first frame rail 308 and a second frame rail 310. The frame rails 308 and 310 extend from the front end 102 of the vehicle 100 to the rear end 104 of the vehicle 100 (e.g., front-to-back). In the embodiment shown in FIG. 2, the first frame rail 308 is substantially parallel to the second frame rail 310 and is separated a distance apart from the first frame rail 308. The frame rails 308 and 310 define a longitudinal axis 312, which extends centrally between the frame rails 308 and 310. As shown in FIG. 2, the chassis 300 engages rear tractive assemblies 304 and front tractive assemblies 306. In the embodiment of FIG. 2, the chassis 300 engages a single front tractive assembly 306 and a pair of rear tractive assemblies 304. In other embodiments there may be more or fewer of either the front tractive assemblies 306 or the rear tractive assemblies 304. The front tractive assemblies 306 and the rear tractive assemblies 304 may include brakes (e.g., disc brakes, drum brakes, air brakes, etc.), gear reductions, steering components, wheel hubs, wheels, tires, and other features. As shown in FIGS. 1 and 2, each of the front tractive assemblies 306 and the rear tractive assemblies 304 include tractive elements, shown as wheel and tire assemblies 314. In other embodiments, at least one of the front tractive assemblies 306 and the rear tractive assemblies 304 include a different type of tractive element (e.g., a track, etc.).

According to the illustrative embodiment shown in FIGS. 1 and 2, the front cabin 600 includes one or more doors, shown as doors 602 that facilitate entering and exiting an interior of the front cabin 600. The interior of the front cabin 600 may include a plurality of seats (e.g., two, three, four, five, etc.), vehicle controls, driving components (e.g., steering wheel, accelerator pedal, brake pedal, etc.), etc. In the embodiment shown in FIG. 2, the cargo body 200 includes a refuse body and a compaction mechanism that is used to maximize the amount of refuse that can be transported in the refuse body. The refuse body includes a large chamber within which material from multiple residential or commercial waste receptacles is stored. In other embodiments, the cargo body 200 includes a truck bed or a flat bed. In yet other embodiments, the cargo body 200 additionally or alternatively includes a boom lift.

According to an illustrative embodiment, the vehicle 100 includes a powertrain system. The powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 306 and the rear tractive assemblies 304. In some embodiments, each of the front tractive assemblies 306 and/or the rear tractive assemblies 304 include an individual motive driver (e.g., a motor that is electrically coupled to the energy storage device, etc.) configured to facilitate independently driving each of the wheel and tire assemblies 314. In some embodiments, a transmission of the vehicle 100 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 314, etc.). The final drive may then propel or moves the vehicle 100. In such embodiments, the vehicle 100 may not include the generator and/or the energy storage device. The powertrain of the vehicle 100 may thereby be a hybrid powertrain or a non-hybrid powertrain. According to an illustrative embodiment, the primary driver is a compression-ignition internal combustion engine that utilizes diesel fuel. In other embodiments, the primary driver is another type of device (e.g., spark-ignition engine, fuel cell, electric motor, etc.) that is otherwise powered (e.g., with gasoline, compressed natural gas, hydrogen, electricity, etc.).

FIG. 2 shows an illustrative embodiment of a sub-frame assembly 400 that is configured to facilitate mounting of the cargo body 200 to the chassis 300. As shown in FIG. 2, the sub-frame assembly 400 is configured to be disposed on the chassis 300 and extends between the front cabin 600 and a rear end 104 of the vehicle 100. Specifically, the sub-frame assembly 400 is configured to be disposed on an upper surface 316 of the frame rails 308 and 310. As shown in FIG. 2, the cargo body 200 is configured to be at least partially disposed atop the sub-frame assembly 400, such that the sub-frame assembly 400 is sandwiched between the cargo body 200 and the chassis 300.

Figure 3:
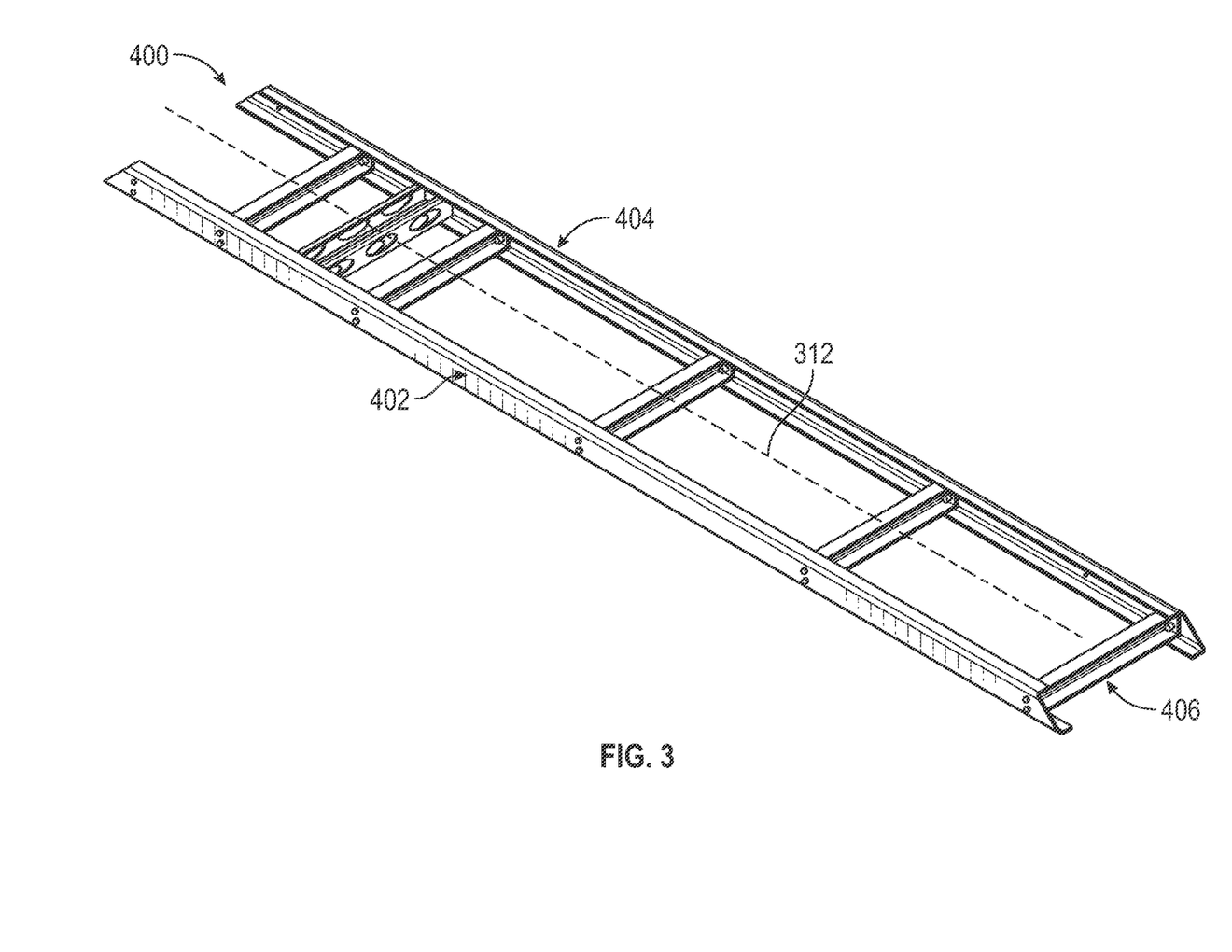
FIG. 3 is a perspective view of a sub-frame assembly, according to an illustrative embodiment.

FIG. 3 shows the embodiment of the sub-frame assembly 400 from FIG. 2 isolated from the vehicle 100. As shown in FIG. 3, the sub-frame assembly 400 includes a pair of frame members, shown as a first frame member 402 and a second frame member 404. The first frame member 402 is oriented in a direction that is substantially parallel to the second frame member 404 and is spaced a distance apart from the second frame member 404. In the embodiment shown in FIG. 3, the distance between the first frame member 402 and the second frame member 404 is approximately the same as the distance between the first frame rail 308 and the second frame rail 310 (see also FIG. 2) such that the first frame member 402 is approximately centered atop the first frame rail 308 and the second frame member 404 is approximately centered atop the second frame rail 310. Alternatively, the spacing may be different. The sub-frame assembly 400 also includes a plurality of support elements, shown as stringers 406 that couple the first frame member 402 to the second frame member 404.

Figure 4:
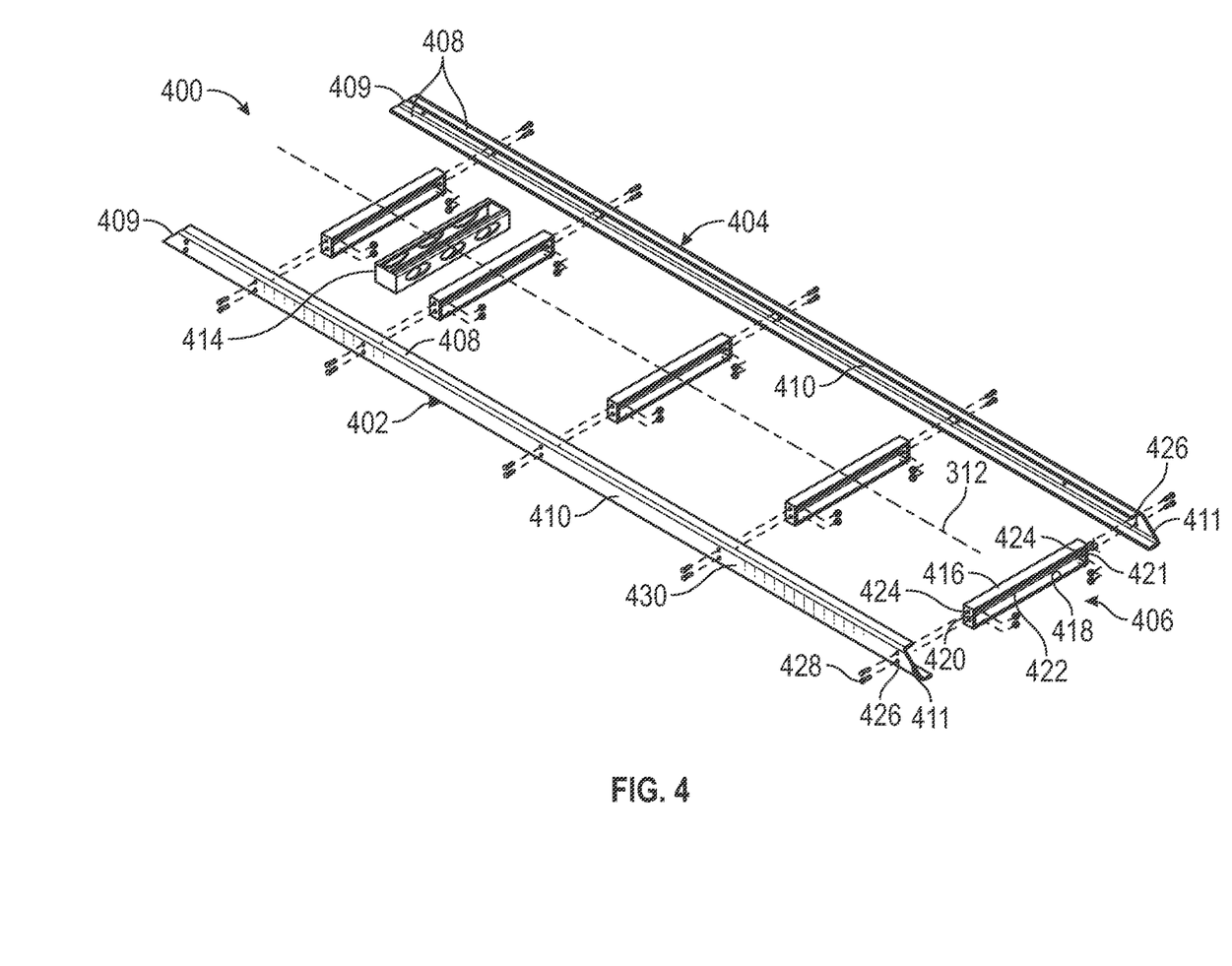
FIG. 4 is an exploded view of FIG. 3.

FIG. 4 shows the sub-frame assembly 400 of FIG. 3 in an exploded view. According to an illustrative embodiment, each of the first frame member 402 and the second frame member 404 is formed from a single piece of material. Alternatively, the frame members 402 and 404 may be formed from multiple pieces of material that are welded or fastened together. As shown in FIG. 4, each of the first frame member 402 and the second frame member 404 is formed as a C-shaped element having two horizontal legs 408 and a vertical leg 410. The horizontal legs 408 are oriented in a direction that is substantially perpendicular to the vertical leg 410. The horizontal legs 408 extend from the vertical leg 410 toward the longitudinal axis 312 and define a channel within which each of the stringers 406 are received.

Figure 5:
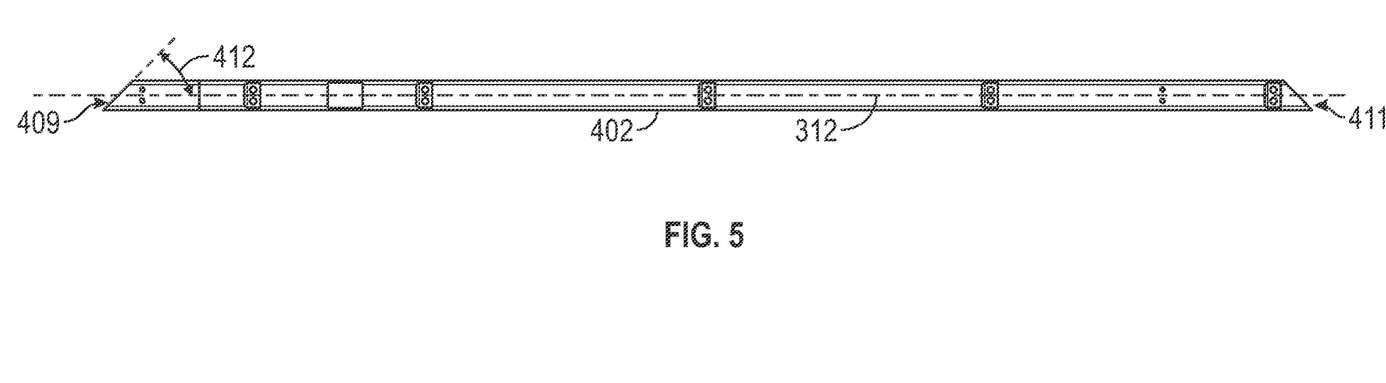
FIG. 5 is a side view of the sub-frame assembly of FIG. 3.

A side view of the embodiment of the sub-frame assembly 400 of FIG. 3 is shown in FIG. 5. As shown in FIG. 5, each of the first frame member 402 and the second frame member 404 (shown in FIG. 4) includes a forward edge 409 and a rear edge 411 opposite the forward edge 409. In the embodiment shown in FIG. 5, each of the forward edge 409 and the rear edge 411 are chamfered (e.g. by cutting the frame members 402 and 404 during the manufacturing process) such that they form an angle 412 with respect to the longitudinal axis 312. Among other benefits, the angle 412 accommodates the shape of the cargo body 200 (e.g., the section of the cargo body 200 that extends below the chassis 300 on the rear end 104 of the vehicle 100 as shown in FIG. 1). Using angled or chamfered edges also eliminates sharp points on the vehicle 100 that would otherwise be prone to cutting or snagging. In the embodiment shown in FIG. 5, the angle 412 formed between the forward edge 409 and the longitudinal axis 312 is the same as the angle formed between the rear edge 411 and the longitudinal axis 312, and is equal to approximately 45°. In other embodiments, any other suitable angle may be utilized.

Returning to FIG. 4, a plurality of stringers 406 are shown between the first frame member 402 and the second frame member 404. Five stringers 406 are shown in FIG. 4, although the required number of stringers 406 may be different in other embodiments depending on structural requirements in different applications and vehicle types. As shown in FIG. 4, each stringer 406 is oriented in a direction that is substantially perpendicular to the longitudinal axis 312. In other embodiments, the stringers may be angled with respect to the longitudinal axis 312 (e.g., the cross bracing for the sub-frame assembly 400 may be formed using two diagonal stringers in an X-shaped manner, or any other suitably strong arrangement of stringers 406). The stringers 406 are spaced along the length of the frame members 402 and 404 and couple the frame members 402 and 404 together. In the embodiment of FIG. 4, three stringers 406 are spaced approximately an equal distance from one another starting proximate to the rear edge 411 of the frame members 402 and 404. A final stringer 406 is located proximate the forward edge 409 of the frame members 402 and 404. In an alternative embodiment, all of the stringers 406 may be spaced at regular intervals (e.g., with similar spacing between adjacent stringers 406) along the length of the frame members 402 and 404 or at any other location that provides adequate structural support for the cargo body 200 (shown in FIGS. 1 and 2).

Other structural members and elements may also be included between the frame members 402 and 404. For example, in the embodiment shown in FIG. 4 (e.g., a refuse truck application), a support structure 414 is provided in between two stringers 406 towards the forward edge 409 of each of the frame members 402 and 404. The support structure 414 is disposed proximate to a contact point between the cargo body 200 and the sub-frame assembly 400 and provides additional structural support to the sub-frame assembly 400 during unload events of the refuse truck as will be further described.

As shown in FIG. 4, each stringer 406 is formed as a single piece of material (e.g., manufactured using a sheet metal stamping and forming process with welded corners). Alternatively, each stringer 406 may be formed from separate pieces of material that are welded or otherwise fastened together. Each stringer 406 includes an upper wall 416, a lower wall 418, a first end, shown as first end wall 420, and a second end, shown as second end wall 421. Together, the upper wall 416, lower wall 418, first end wall 420 and second end wall 421 form a recessed area 422. As shown in FIG. 4, each of the first end wall 420 and the second end wall 421 of each stringer 406 includes a plurality of stringer holes, shown as holes 424 that are alignable with (e.g., such that they share a common axis with) mating holes in one of the first frame member 402 and the second frame member 404, shown as holes 426.

In the embodiment of FIG. 4, the first end wall 420 and the second end wall 421 are received within the C-shaped channel of either the first frame member 402 or the second frame member 404. As shown in FIG. 4, a plurality of fasteners are received within the holes 424 and 426 to couple each stringer 406 to both the first frame member 402 and the second frame member 404. In the embodiment of FIG. 4, the fasteners take the form of a bolt 428 that is inserted from an outer face 430 of each frame member 402 and 404. Each of the bolts 428 passes through the frame members 402 and 404 and one of the first end wall 420 and the second end wall 421 toward the longitudinal axis 312. A nut 432 is inserted into the recessed area 422 of each stringer 406 to secure each bolt 428 in place and prevent movement of the stringers 406 with respect to the first and second frame members 402 and 404.

Figure 6:
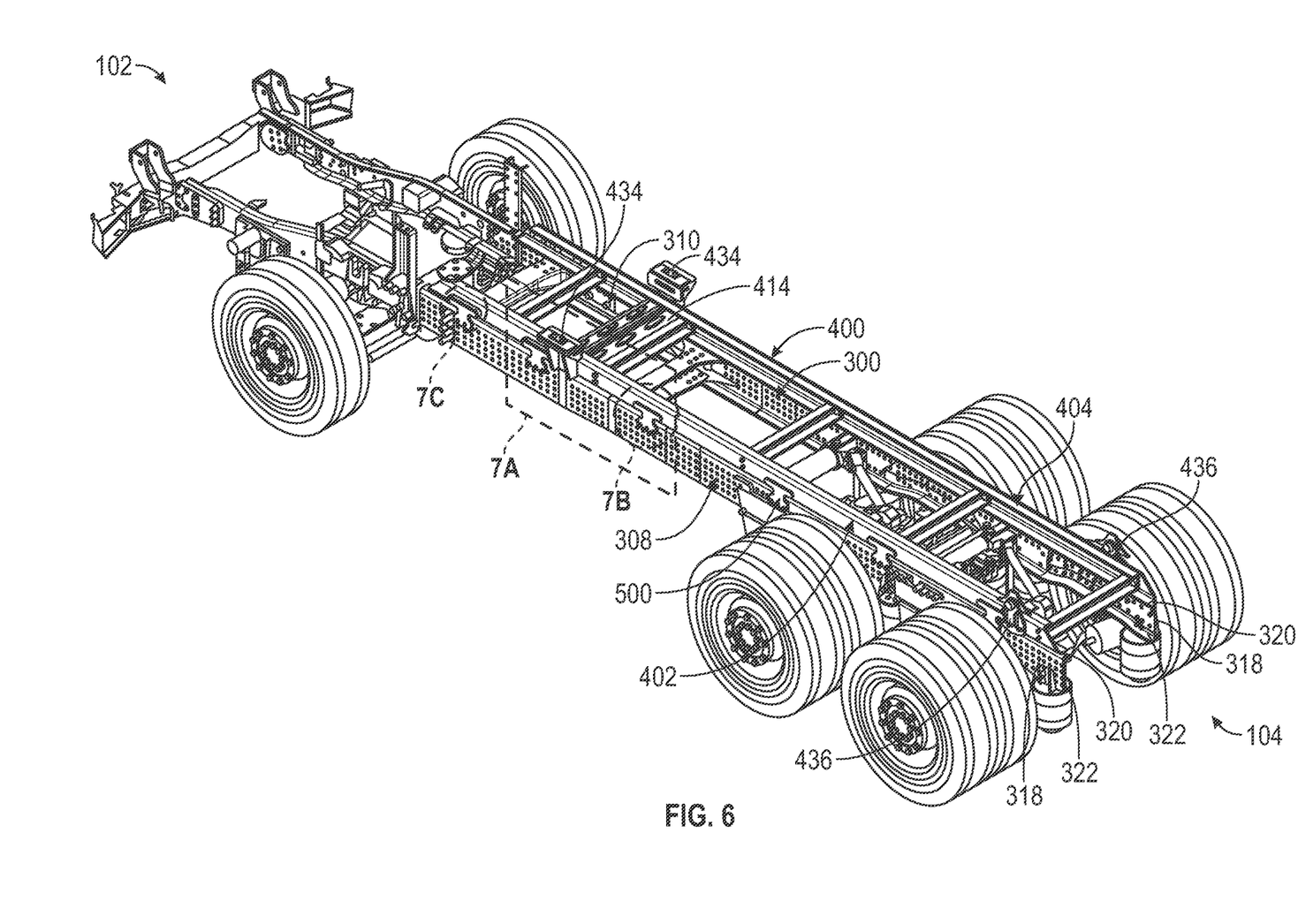
FIG. 6 is a perspective view of a vehicle chassis, according to an illustrative embodiment.

FIG. 6 shows an illustrative embodiment of the chassis 300 coupled to the sub-frame assembly 400. As shown in FIG. 6, each of the first frame rail 308 and the second frame rail 310 are formed in a C-shape defined by a vertical portion 318, an upper leg 320, and a lower leg 322. The upper leg 320 and lower leg 322 are substantially parallel to one another and substantially perpendicular to the vertical portion 318. The sub-frame assembly 400 is configured to be disposed on the chassis 300; for example, such that one of the horizontal legs 408 of the first frame member 402 contacts the upper leg 320 of the first frame rail 308, while at the same time one of the horizontal legs 408 of the second frame member 404 contacts the upper leg 320 of the second frame rail 310.

As shown in FIG. 6, the sub-frame assembly 400 is coupled (e.g., mounted) to the chassis 300 using a plurality of sub-frame adapters, shown as universal mounting brackets 500. In the embodiment of FIG. 6, the universal mounting brackets 500 are positioned along the length of the chassis 300. The four universal mounting brackets 500 toward the rear end 104 of the vehicle 100 are spaced approximately an equal distance from one another, while in comparison, the two universal mounting brackets 500 nearest the front end 102 of the vehicle 100 are spaced much more closely to one another. Alternatively, the spacing between each of the universal mounting brackets 500 may be different. In the embodiment shown in FIG. 6, the arrangement of universal mounting brackets 500 that couple the second frame member 404 to the second frame rail 310 is identical to the arrangement of universal mounting brackets 500 that couple the first frame member 402 to the first frame rail 308.

As shown in FIG. 6, in an illustrative embodiment the vehicle 100 (e.g., a refuse truck) includes a cargo body contact point, shown as contact pads 434 and a pivot connector, shown as flanges 436, both of which are disposed on the sub-frame assembly 400. Returning to FIG. 1, the flanges 436 are coupled to the sub-frame assembly 400 toward the rear end 104 of the vehicle 100 (e.g., using bolts, screws, or any other suitable fastener), whereas the contact pads 434 are coupled to the sub-frame assembly 400 toward the forward edge 409 of the sub-frame assembly 400 (e.g., using screws, bolts, or any other suitable fastener). The cargo body 200 is pivotably mounted to the flanges 436, allowing the cargo body 200 to tilt with respect to the chassis 300 between a loading position, where the cargo body 200 is proximate to the contact pads 434, and an unloading position, where the cargo body 200 is spaced a distance away from the contact pads 434. To unload waste material from the cargo body 200, the cargo body 200 pivots away from the contact pads 434, emptying its contents from the rear end 104 of the vehicle 100. Once the contents of the cargo body 200 are unloaded, the cargo body 200 returns toward the contact pads 434 and in certain scenarios may forcibly engage with the contact pads 434. Accordingly, a support structure 414 is coupled to the sub-frame assembly 400 proximate to the contact pads 434 to protect the structure against damage caused by repeated engagement of the contact pads 434 with the cargo body 200.

Figure 7A:
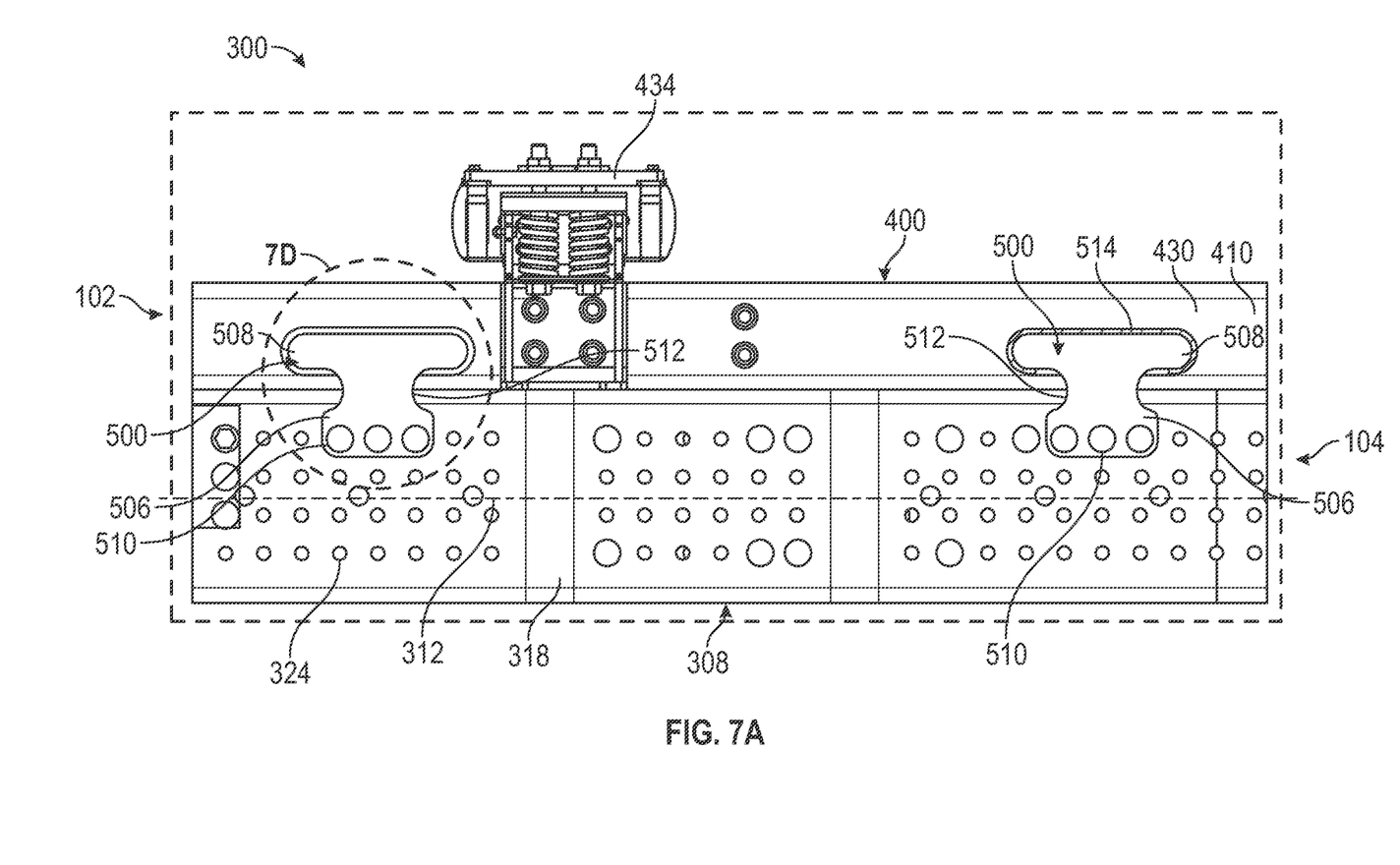
FIG. 7A is an enlarged side view of the vehicle chassis of FIG. 6, in a region between a forward sub-frame adapter and a rear sub-frame adapter.

FIG. 7A shows an enlarged side view of the chassis 300 of FIG. 6 in the region of the contact pads 434. As shown in FIG. 7A, the first frame rail 308 includes a plurality of mounting holes, shown as holes 324 that pass through the vertical portion 318 of the first frame rail 308. The holes 324 are arranged in a rectangular pattern such that adjacent holes are aligned in both a horizontal direction and a vertical direction. In other embodiments, the alignment or spacing of holes 324 may be different. The arrangement of holes 324 in the first frame rail 308 is identical to the arrangement of holes in the second frame rail 310 (e.g. the arrangement of features described on the side of the vehicle 100 shown in FIGS. 7A-7D apply equally to arrangement and design of features on the opposite side of the vehicle 100). As shown in the embodiment of FIG. 7A, the sub-frame assembly 400 is coupled to the chassis 300 using a plurality of universal mounting brackets 500. As shown in FIG. 7A, the universal mounting brackets 500 toward the front end 102 of the vehicle 100 (also see FIG. 6) are the same as the universal mounting brackets 500 used toward the rear end 104 of the vehicle 100 (see also FIG. 6). Alternatively, the design of the universal mounting brackets 500 may be different.

In the embodiment of FIG. 7A, each of the universal mounting brackets 500 is made from a single piece of material (e.g., a piece of sheet metal formed by a metal cutting or stamping process, or any other suitably strong material). Alternatively, the universal mounting brackets may be formed from multiple pieces of material welded or otherwise fastened together. Each universal mounting bracket 500 includes a first connecting region 506 and a second connecting region 508 opposite the first connecting region 506. In the embodiment shown in FIG. 7A, the first connecting region 506 is rectangular in shape with curved corners. The first connecting region 506 includes a plurality of through-holes, shown as holes 510. Each one of the plurality of holes 510 is alignable with a corresponding one of the plurality of mounting holes 324 in the first frame rail 308. In other words, the pattern of holes 510 in the first connecting region 506 is arranged to match with a pattern of mounting holes 324 in the first frame rail 308. In the embodiment shown in FIG. 7A, the holes 510 disposed in the first connecting region 506 are arranged to align with a set of horizontally aligned mounting holes 324 from the pattern of mounting holes 324 in the first frame rail 308. In alternative embodiments, the number or arrangement of holes in the first connecting region 506 may be different. For example, the first connecting region 506 may be resized to include any number of holes 510 (e.g., in any desired pattern), each hole 510 aligning with a different (e.g., a corresponding one) mounting hole 324 in the first frame rail 308.

In the illustrative embodiment of FIG. 7A, the second connecting region 508 is shaped as a rectangle with two rounded ends disposed on opposite ends of the second connecting region (e.g., a racetrack or lozenge shape). This particular shape provides greater coverage of the first frame member 402 in a longitudinal direction, parallel to the longitudinal axis 312. In other words, a length of the second connecting region 508 in a longitudinal direction is greater than a length of the first connecting region 506 in a longitudinal direction. Various alternative shapes are contemplated; for example, the second connecting region 508 may be elliptical or rectangular with rounded corners or any other suitable shape. In the embodiment shown in FIG. 7A, the first connecting region 506 transitions to the second connecting region 508 along edges 512 having a constant radius of curvature, an arrangement that reduces stress on the universal mounting brackets 500 during normal vehicle operations. Again, various alternatives are contemplated, although generally the edges 512 will be shaped to reduce stress on the universal mounting bracket 500 in the region in between the first connecting region 506 and the second connecting region 508, while minimizing the mass of the universal mounting bracket 500.

Figure 7B:
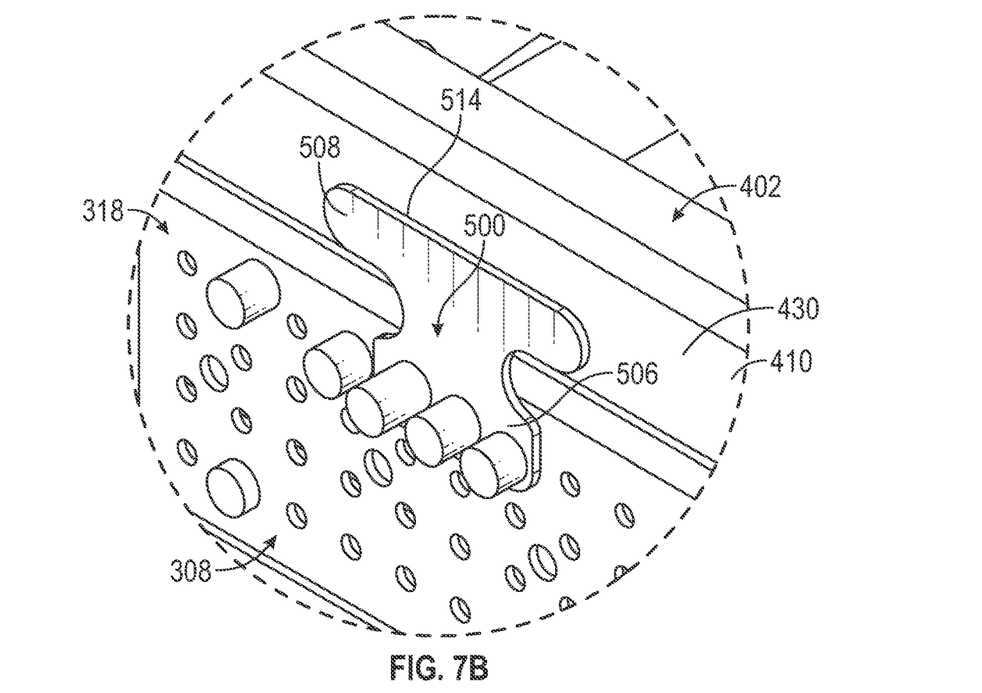
FIG. 7B is a detailed view of a sub-frame adapter from the vehicle chassis of FIG. 6 located toward a front end of the vehicle.
Figure 7C:
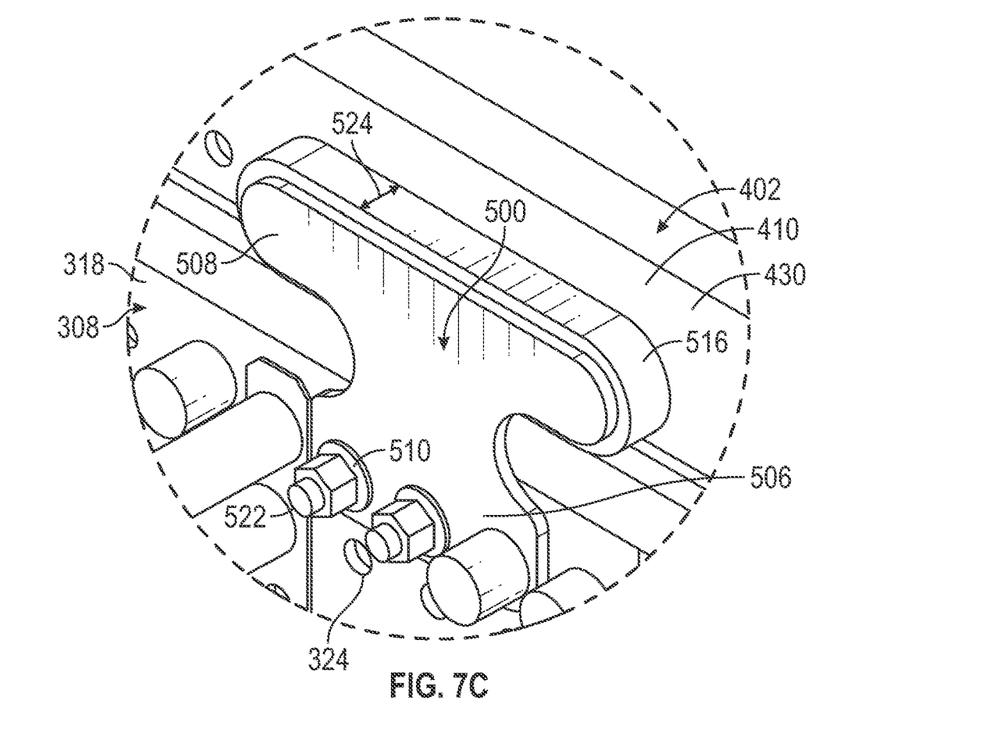
FIG. 7C is a detailed view of a sub-frame adapter from the vehicle chassis of FIG. 6 located toward a rear end of the vehicle.

A detailed view of the universal mounting bracket 500 located rearward (closer to the rear end 104 of the vehicle 100) of the contact pad 434 from FIGS. 6 and 7A is shown in FIG. 7B, while a detailed view of the universal mounting bracket 500 located forward (closer to the front end 102 of the vehicle 100) of the contact pad 434 from FIGS. 6 and 7A is shown in FIG. 7C. As shown in the embodiments of FIGS. 7A and 7B, the first connecting region 506 is removably coupled to the first frame rail 308 using a plurality of bolts 522. In alternative embodiments, the first connecting region 506 may be fastened to the first frame rail 308 using rivets or any other suitable fastener. As shown in FIG. 7C, each of the bolts 522 is inserted through one of the mounting holes 324 and through a corresponding one of the holes 510 in the first connecting region 506.

In the embodiment shown in FIG. 7B, the second connecting region 508 for each of the universal mounting brackets 500 is configured to be permanently coupled to the sub-frame assembly 400. The second connecting region may be secured to the first frame member 402 using a welding process; for example, by welding along a joint 514 formed between the second connecting region 508 and the vertical leg 410 of the first frame member 402 (the joint 514 that follows along the perimeter of the second connecting region 508 as shown in FIG. 7A). In particular, this approach may be used in embodiments where the outer face 430 of the vertical leg 410 of the first frame member 402 is approximately flush with the outermost face of the vertical portion 318 of the first frame rail 308 (e.g., such that the outer face 430 of the vertical leg 410 of the first frame member 402 lies along a plane passing through the outermost face of the vertical portion 318 of the first frame rail 308).

In other embodiments or different longitudinal positions along the chassis 300, the vertical leg 410 of the first frame member 402 may be spaced a distance away from the vertical portion 318 of the first frame rail 308, which may occur, for example, when the spacing between the first frame rail 308 and the second frame rail 310 (see FIG. 6) is greater than the spacing between the first frame member 402 and the second frame member 404. As shown in FIG. 7C, a spacer, shown as standoff 516 may be included between the second connecting region 508 and the vertical leg 410 of the first frame member 402 to accommodate this gap. The thickness of the standoff 516 (e.g., in a direction extending outward from the outer face 430 of the vertical leg 410 of the first frame member 402) may be modified as needed to suit a wide range of different third-party vehicle chassis designs. For example, in the embodiment of FIG. 7C, a first distance between an outer lateral surface of the first frame rail 308 and the second frame rail 310 may be greater than a second distance between an outer lateral surface of the first frame member 402 and the second frame member 404. A thickness 524 of the standoff 516 may be sized to occupy a gap formed between the frame rails 308, 310 and the frame members 404. For example, the thickness 524 may be approximately equal to half of a difference between the first distance and the second distance. A second standoff, of approximately equal thickness to the first standoff may be provided on a second one of the frame members 404 in order to center the sub-frame assembly 400 with respect to the vehicle 100 (e.g., frame rails 308, 310). According to an exemplary embodiment, the standoff 516 has approximately the same shape as at least a portion of the second connecting region 508 of the universal mounting bracket 500.

Figure 7D:
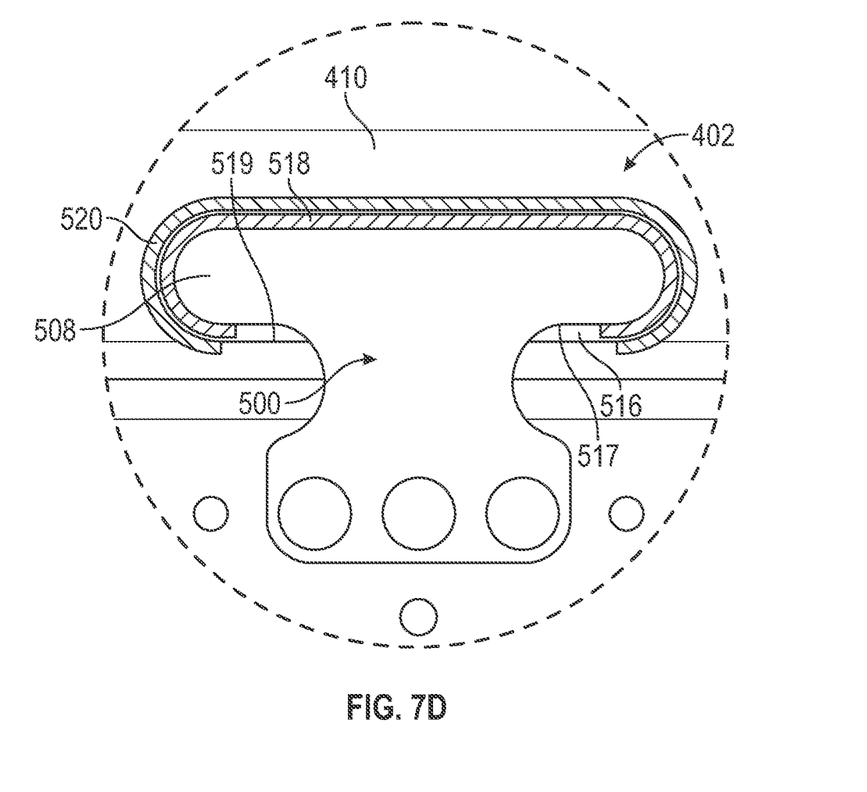
FIG. 7D is a side view of the sub-frame adapter of FIG. 7C, showing the location of a weld joint.

As shown in FIG. 7D, the second connecting region 508 of the universal mounting bracket 500 may by welded to the standoff 516 along a first perimeter joint 518 formed between the second connecting region 508 and the standoff 516 (e.g., an outer perimeter 517 of the second connecting region), while the standoff 516 may be welded to the vertical leg 410 of the first frame member 402 along a second perimeter joint 520 formed between the standoff 516 and the vertical leg 410 of the first frame member 402 (e.g., an outer perimeter 519 of the standoff 516).

The components of the vehicle 100 (see FIG. 1) in the foregoing description may be assembled in any order or concurrently in a vehicle manufacturing process. For example, according to the illustrative embodiment shown in FIG. 1, a method of manufacture includes the steps of aligning one of the through-holes, shown as holes 510 with one of the mounting holes 324 on one of the first frame rail 308 and second frame rail 310 (see also FIG. 2), inserting a fastener through the aligned holes 510 and mounting holes 324, placing the sub-frame assembly 400 on an upper surface 316 (shown in FIG. 2) of the first frame rail 308 and the second frame rail 310, and welding the second connecting region 508 to one of the first frame member 402 and the second frame member 404 (shown in FIG. 2).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A sub-frame adapter, comprising:
   a body, including:
      a first connecting region disposed on a first end of the body and configured to be coupled to a frame rail of a vehicle, the first connecting region defining a plurality of openings that are alignable with a plurality of mounting openings in the frame rail; and
      a second connecting region disposed on a second end of the body and contiguous with the first connecting region, the second connecting region transitioning to the first connecting region along edges having an approximately constant radius of curvature.

2. The sub-frame adapter of claim 1, wherein the vehicle is a refuse vehicle, and wherein the sub-frame adapter is configured to couple a sub-frame assembly of a refuse body to the frame rail.

3. The sub-frame adapter of claim 1, further comprising a spacer coupled to the second connecting region and extending away from the body in a lateral direction that is substantially perpendicular to the body.

4. The sub-frame adapter of claim 3, wherein a cross-sectional shape of the spacer is approximately the same as a shape formed by an outer perimeter of the second connecting region, and wherein the spacer protrudes outwardly beyond the outer perimeter of the second connecting region.

5. The sub-frame adapter of claim 4, wherein the second connecting region is welded to the spacer along an entire perimeter of the second connecting region.

6. The sub-frame adapter of claim 1, wherein an outer perimeter of the second connecting region is racetrack shaped, and wherein an outer perimeter of the first connecting region is substantially rectangular with rounded corners.

7. The sub-frame adapter of claim 1, wherein the first connecting region is configured to be coupled to the frame rail via fasteners extending through the plurality of openings, and wherein the second connecting region is configured to be welded to the sub-frame assembly disposed between the frame rail and a cargo body of the vehicle.

8. The sub-frame adapter of claim 1, wherein the first connecting region has a first length in a longitudinal direction, and the second connecting region has a second length in the longitudinal direction that is greater than the first length.

9. A sub-frame adapter, comprising: a body, including:
   a first connecting region disposed at a first end of the body and configured to be coupled to a frame rail of a vehicle, the first connecting region defining a plurality of openings that are alignable with a plurality of mounting openings in the frame rail, the first connecting region having a first length in a longitudinal direction; and
   a second connecting region disposed on a second end of the body, the second connecting region contiguous with the first connecting region and having a second length in the longitudinal direction that is greater than the first length.

10. The sub-frame adapter of claim 9, wherein the vehicle is a refuse vehicle, and wherein the sub-frame adapter is configured to couple a sub-frame assembly of a refuse body to the frame rail.

11. The sub-frame adapter of claim 9, further comprising a spacer coupled to the second connecting region and extending away from the body in a lateral direction that is substantially perpendicular to the body.

12. The sub-frame adapter of claim 11, wherein a cross-sectional shape of the spacer is approximately the same as a shape of the second connecting region and protrudes outwardly beyond an outer boundary of the first connecting region.

13. The sub-frame adapter of claim 11, wherein the second connecting region is welded to the spacer along an entire perimeter of the second connecting region.

14. The sub-frame adapter of claim 9, wherein an outer perimeter of the second connecting region is racetrack shaped, and wherein an outer perimeter of the first connecting region is substantially rectangular with rounded corners.

15. The sub-frame adapter of claim 9, wherein the first connecting region is configured to be coupled to the frame rail via fasteners extending through the plurality of openings, and wherein the second connecting region is configured to be welded to a sub-frame assembly disposed between the frame rail and a cargo body of the vehicle.

16. A refuse body adapter assembly, comprising:
   a sub-frame assembly configured to be disposed between a chassis of a vehicle and a cargo body, the sub-frame assembly comprising:
      a first frame member;
      a second frame member substantially parallel to the first frame member and spaced a first distance apart from the first frame member; and
      a stringer coupled to and disposed between first frame member and the second frame member; and
   a sub-frame adapter, including:
      a first connecting region coupled to the first frame member; and a second connecting region configured to be coupled to a frame rail of the chassis to secure the chassis to the sub-frame assembly, wherein the first connecting region and the second connecting region are disposed on opposing ends of the sub-frame adapter, and wherein the second connecting region transitions to the first connecting region along edges having an approximately constant radius of curvature.

17. The refuse body adapter assembly of claim 16, wherein the first connecting region is disposed on a first end of the sub-frame adapter and has a first length in a longitudinal direction, wherein the second connecting region is disposed on a second end of the sub-frame adapter and has a second length in the longitudinal direction that is less than the first length.

18. The refuse body adapter of claim 16, further comprising a spacer disposed laterally between the first connecting region and the first frame member, wherein a thickness of the spacer is sized to accommodate a lateral gap between the first frame member and the frame rail.

19. The refuse body adapter of claim 18, wherein a cross-sectional shape of the spacer is approximately the same as a shape formed by an outer perimeter of the first connecting region, and wherein the spacer protrudes outwardly beyond the outer perimeter of the first connecting region.

\* \* \* \* \*